US011831255B2

(12) United States Patent
Fu et al.

(10) Patent No.: US 11,831,255 B2
(45) Date of Patent: Nov. 28, 2023

(54) SCANNER DRIVEN BY PIEZOELECTRIC ACTUATORS AND METHOD OF MAKING THE SAME (71) Applicant: Ultimems, Inc., New Taipei (TW)

(72) Inventors: Yee-Chung Fu, Fremont, CA (US); Han-Tang Su, Taichung (TW); Yu-Chun Yu, New Taipei (TW)

(73) Assignee: ULTIMEMS, INC., New Taipei (TW)

( * ) Notice: Subject to any disclaimer, the term of this patent is extended or adjusted under 35 U.S.C. 154(b) by 479 days.

(21) Appl. No.: 17/233,513

(22) Filed: Apr. 18, 2021

(65) Prior Publication Data

US 2021/0333540 A1   Oct. 28, 2021

Related U.S. Application Data

(60) Provisional application No. 63/015,536, filed on Apr. 25, 2020.

(51) Int. Cl.
*H02N 2/02* (2006.01)
*H02N 2/00* (2006.01)
*G02B 26/08* (2006.01)
*G02B 26/10* (2006.01)

(52) U.S. Cl.
CPC ............... *H02N 2/028* (2013.01); *H02N 2/22* (2013.01); *G02B 26/0858* (2013.01); *G02B 26/101* (2013.01)

(58) Field of Classification Search
CPC .......... H02N 2/028; H02N 2/22; H02N 2/123; G02B 26/0858; G02B 26/101
See application file for complete search history.

(56) References Cited

U.S. PATENT DOCUMENTS

| | | | |
|---|---|---|---|
| 7,773,282 B2 | 8/2010 | Tani et al. | |
| 7,864,393 B2 | 1/2011 | Uchigaki et al. | |
| 7,969,637 B1* | 6/2011 | Fu | G02B 26/101 |
| | | | 359/224.1 |
| 8,098,415 B2 | 1/2012 | Kanno et al. | |
| 11,327,295 B2* | 5/2022 | Carminati | B81B 3/0021 |

OTHER PUBLICATIONS

"All around Scanning MEMS Mirror Driven by Piezoelectric Actuators", Yoshitaka Kajiyama, et al., The 10th Japan-China-Korea Joint Conference on MEMS/NEMS 2019.

* cited by examiner

*Primary Examiner* — Emily P Pham
(74) *Attorney, Agent, or Firm* — Chen-Chi Lin (57) ABSTRACT

A scanner comprises a mirror, a first piezoelectric actuator, a second piezoelectric actuator, a third piezoelectric actuator, a fourth piezoelectric actuator, a first connecting member, a second connecting member, a first mirror spring, a second mirror spring, a stationary member, a first plurality of actuator springs, a second plurality of actuator springs, a third plurality of actuator springs, a fourth plurality of actuator springs, a first plurality of electrodes, and a second plurality of electrodes. The scanner is driven by piezoelectric actuators. A method of fabricating the scanner comprises the steps of providing a wafer; oxidation; deposition; patterning; and applying a singulation process.

15 Claims, 6 Drawing Sheets

SCANNER DRIVEN BY PIEZOELECTRIC ACTUATORS AND METHOD OF MAKING THE SAME

CROSS-REFERENCE TO RELATED APPLICATIONS

This patent application claims benefit of a provisional patent application 63/015,536 filed on Apr. 25, 2020. The disclosure made in the provisional patent application 63/015,536 is hereby incorporated by reference. "All around Scanning MEMS Mirror Driven by Piezoelectric Actuators", Yoshitaka Kajiyama et al., The 10th Japan-China-Korea Joint Conference on MEMS/NEMS 2019; U.S. Pat. No. 7,773,282 to Tani et al.; U.S. Pat. No. 7,864,393 to Uchigaki et al.; U.S. Pat. No. 8,098,415 to Kanno et al.; and U.S. Pat. No. 9,201,239 to Fu are hereby incorporated by reference.

FIELD OF THE INVENTION

This invention relates generally to a scanner and a method of fabricating the scanner. More particularly, the present invention relates to a Micro-Electro Mechanical Systems (MEMS) scanner driven by piezoelectric actuators.

BACKGROUND OF THE INVENTION

U.S. Pat. No. 9,201,239 to Fu uses electrostatic comb drives to drive mirrors. U.S. Pat. No. 7,773,282 to Tani et al. uses piezoelectric cantilevers to drive rotation of a mirror. Displacement is usually small for conventional mirrors driven by piezoelectric actuators. The present disclosure uses springs to amplify mirror rotation angles driven by piezoelectric actuators.

SUMMARY OF THE INVENTION

This invention discloses a scanner comprising a mirror, a first piezoelectric actuator, a second piezoelectric actuator, a third piezoelectric actuator, a fourth piezoelectric actuator, a first connecting member, a second connecting member, a first mirror spring, a second mirror spring, a stationary member, a first plurality of actuator springs, a second plurality of actuator springs, a third plurality of actuator springs, a fourth plurality of actuator springs, a first plurality of electrodes, and a second plurality of electrodes. A method of fabricating the scanner is also disclosed.

BRIEF DESCRIPTION OF THE DRAWINGS

FIGS. 4A, 4B, 4C, 4D, 4E, 4F, 4G, 4H, 4I, and 4J show the steps of the process to fabricate the scanner of FIG. 1 in examples of the present disclosure.

DETAILED DESCRIPTION OF THE INVENTION

Figure 1:
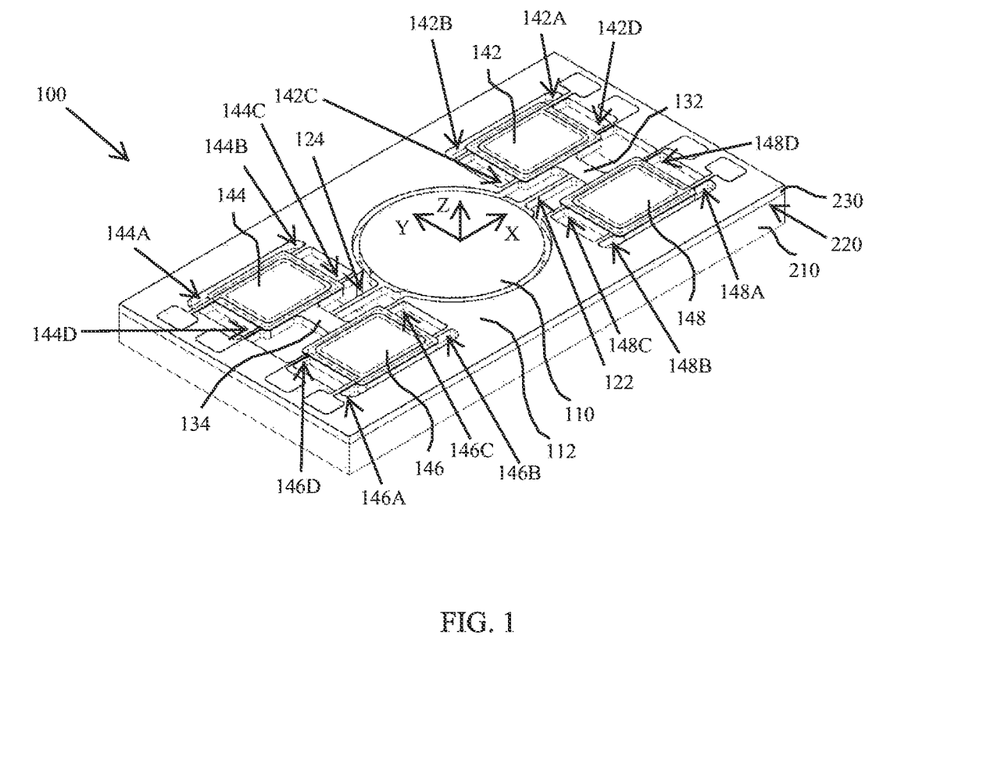
FIG. 1 is a schematic perspective view of a scanner in examples of the present disclosure.
Figure 2:
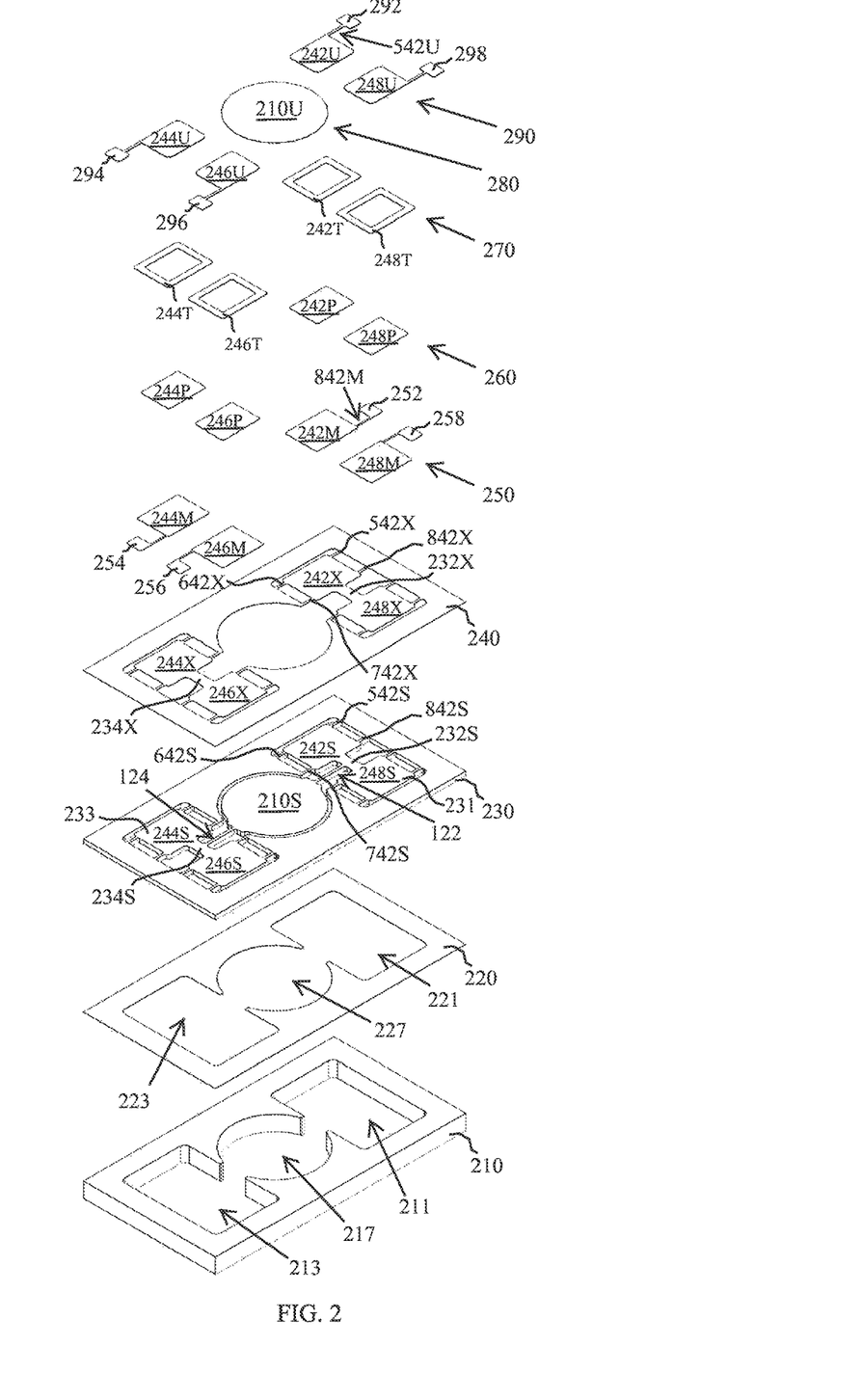
FIG. 2 is an exploded plot of the scanner of FIG. 1 in examples of the present disclosure.

FIG. 1 is a schematic perspective view of a scanner 100 in examples of the present disclosure. FIG. 2 is an exploded plot of the scanner 100 of FIG. 1 in examples of the present disclosure. The scanner 100 comprises a mirror 110, a first piezoelectric actuator 142, a second piezoelectric actuator 144, a third piezoelectric actuator 146, a fourth piezoelectric actuator 148, a first connecting member 132, a second connecting member 134, a first mirror spring 122, a second mirror spring 124, a stationary member 112, a first plurality of actuator springs (for example, 142A, 142B, 142C, and 142D), a second plurality of actuator springs (for example, 144A, 144B, 144C, and 144D), a third plurality of actuator springs (for example, 146A, 146B, 146C, and 146D), a fourth plurality of actuator springs (for example, 148A, 148B, 148C, and 148D), a first plurality of electrodes (for example, 252, 254, 256, and 258), and a second plurality of electrodes (for example, 292, 294, 296, and 298).

In examples of the present disclosure, the mirror 110 is to rotate about a first direction, X-axis. The first connecting member 132 connects the first piezoelectric actuator 142 to the fourth piezoelectric actuator 148. The second connecting member 134 connects the second piezoelectric actuator 144 to the third piezoelectric actuator 146. The first mirror spring 122 connects the mirror 110 to the first connecting member 132. The second mirror spring 124 connects the mirror 110 to the second connecting member 134.

In one example, the mirror 110 is of a circular shape. In another example, the mirror 110 is of an oval shape. In still another example, the mirror 110 is of a rectangular shape. In one example, the first piezoelectric actuator 142, the second piezoelectric actuator 144, the third piezoelectric actuator 146, and the fourth piezoelectric actuator 148 are of rectangular shapes. In another example, the first piezoelectric actuator 142, the second piezoelectric actuator 144, the third piezoelectric actuator 146, and the fourth piezoelectric actuator 148 are of circular shapes. In still another example, the first piezoelectric actuator 142, the second piezoelectric actuator 144, the third piezoelectric actuator 146, and the fourth piezoelectric actuator 148 are of oval shapes.

In examples of the present disclosure, the first piezoelectric actuator 142 and the second piezoelectric actuator 144 are symmetric with respect to a first plane, YZ-plane, perpendicular to the first direction, X-axis. The third piezoelectric actuator 146 and the fourth piezoelectric actuator 148 are symmetric with respect to the first plane, YZ-plane. The first piezoelectric actuator 142 and the fourth piezoelectric actuator 148 are symmetric with respect to a second plane, XZ-plane, containing the first direction, X-axis. The second piezoelectric actuator 144 and the third piezoelectric actuator 146 are symmetric with respect to the second plane, XZ-plane. The first plane, YZ-plane, is perpendicular to the second plane, XZ-plane.

In examples of the present disclosure, the scanner 100 is under excitation at a fundamental frequency of the scanner 100. A mode shape of the fundamental frequency of the scanner 100 includes a rotation of the mirror 110, an upward concave deformation of the first piezoelectric actuator 142, an upward concave deformation of the second piezoelectric actuator 144, a downward concave deformation of the third piezoelectric actuator 146, and a downward concave deformation of the fourth piezoelectric actuator 148.

In examples of the present disclosure, driving signals are applied to top electrodes 292, 294, 296, and 298 and bottom electrodes 252, 254, 256, and 258 to drive the mirror. The driving signals of the first piezoelectric actuator 142, the second piezoelectric actuator 144, the third piezoelectric actuator 146, and the fourth piezoelectric actuator 148 are symmetric with respect to the YZ-plane and are anti-symmetric with respect to the XZ-plane.

In one example, the first mirror spring 122 is a linear spring and the second mirror spring 124 is a linear spring. In another example, the first mirror spring 122 is a serpentine spring (for example, spring 1140 of FIG. 4A of U.S. Pat. No. 9,201,239 to Fu) and the second mirror spring 124 is a serpentine spring.

In examples of the present disclosure, the first plurality of actuator springs (for example, 142A, 142B, 142C, and 142D) connect the first piezoelectric actuator 142 to the stationary member 112. The second plurality of actuator springs (for example, 144A, 144B, 144C, and 144D) connect the second piezoelectric actuator 144 to the stationary member 112. The third plurality of actuator springs (for example, 146A, 146B, 146C, and 146D) connect the third piezoelectric actuator 146 to the stationary member 112. The fourth plurality of actuator springs (for example, 148A, 148B, 148C, and 148D) connect the fourth piezoelectric actuator to the stationary member 112.

In examples of the present disclosure, the first plurality of actuator springs comprises a first outer external actuator spring 142A, a first inner external actuator spring 142B, a first inner internal actuator spring 142C, and a first outer internal actuator spring 142D.

In examples of the present disclosure, the second plurality of actuator springs comprises a second outer external actuator spring 144A, a second inner external actuator spring 144B, a second inner internal actuator spring 144C, and a second outer internal actuator spring 144D.

In examples of the present disclosure, the third plurality of actuator springs comprises a third outer external actuator spring 146A, a third inner external actuator spring 146B, a third inner internal actuator spring 146C, and a third outer internal actuator spring 146D.

In examples of the present disclosure, the fourth plurality of actuator springs comprises a fourth outer external actuator spring 148A, a fourth inner external actuator spring 148B, a fourth inner internal actuator spring 148C, and a fourth outer internal actuator spring 148D.

In examples of the present disclosure, the scanner 100 includes a first silicon layer 210, a first oxide layer 220, a second silicon layer 230, a second oxide layer 240, a metal layer 250, a piezoelectric film layer 260, a tetraethyl orthosilicate (TEOS) deposition 270, and a metal deposition 280 and 290.

In examples of the present disclosure, the first oxide layer 220 comprises silicon dioxide. The second oxide layer 240 comprises silicon dioxide. The metal layer 250 comprises platinum and titanium. The metal deposition 280 and 290 comprises platinum and titanium. The piezoelectric film layer 260 comprises lead zirconate titanate (PZT).

In examples of the present disclosure, an entirety of a top surface of the first silicon layer 210 is flat. An entirety of a bottom surface of the first silicon layer 210 is flat. An entirety of a top surface of the second silicon layer 230 is flat. An entirety of a bottom surface of the second silicon layer 230 is flat. An entirety of a top surface of the metal layer 250 is flat. An entirety of a bottom surface of the metal layer 250 is flat. An entirety of a top surface of the piezoelectric film layer 260 is flat. An entirety of a bottom surface of the piezoelectric film layer 260 is flat.

Figure 4A:
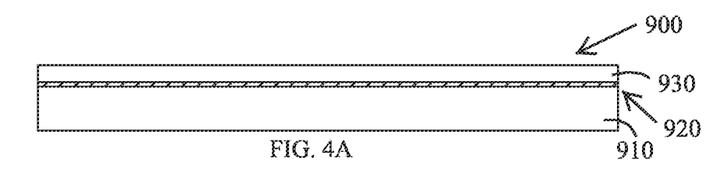
Figure 4B:
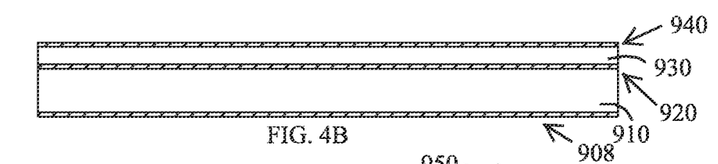
Figure 4C:
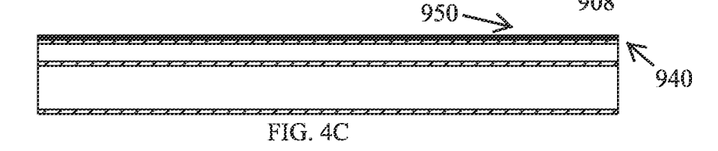
Figure 4D:
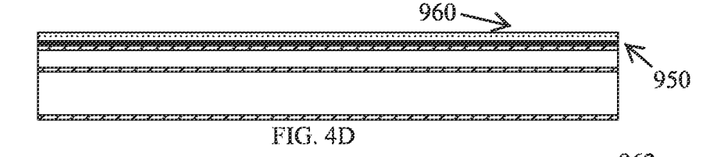
Figure 4E:
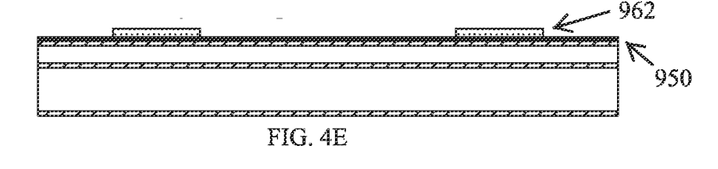
Figures 4F, 4G:
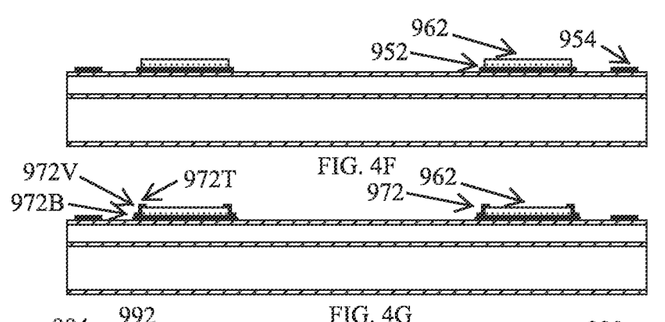

In examples of the present disclosure, the TEOS deposition 270 comprises a lower horizontal section 972B of FIG. 4G, a vertical section 972V of FIG. 4G, and an upper horizontal section 972B of FIG. 4G. The metal deposition 280 and 290 comprises a first portion 994 of FIG. 4H attached to the TEOS deposition 270, a second portion 992 of FIG. 4H attached to the piezoelectric film layer 260, and a third portion 280 of FIG. 2 and FIG. 4H attached to the mirror 110. A top surface 210U of FIG. 2 of the third portion 280 is flat. A vertical location of the third portion 280 is lower than a vertical location of the second portion 992.

In examples of the present disclosure, a bottom surface of the first oxide layer 220 is directly attached to a top surface of the first silicon layer 210. A bottom surface of the second silicon layer 230 is directly attached to a top surface of the first oxide layer 220. A bottom surface of the second oxide layer 240 is directly attached to a top surface of the second silicon layer 230. A bottom surface of the metal layer 250 is directly attached to a top surface of the second oxide layer 240. A bottom surface of the piezoelectric film layer 260 is directly attached to a top surface of the metal layer 250.

In examples of the present disclosure, an entirety of the first mirror spring 122 is contained in the second silicon layer 230. An entirety of the second mirror spring 124 is contained in the second silicon layer 230.

In examples of the present disclosure, the first silicon layer 210 comprises a first cavity 211, a central cavity 217, and a second cavity 213. The first cavity 211 accommodates deformation of the first piezoelectric actuator 142 and the fourth piezoelectric actuator 148. The central cavity 217 accommodates rotation of the mirror 110. The second cavity 213 accommodates deformation of the second piezoelectric actuator 144 and the third piezoelectric actuator 146.

In examples of the present disclosure, the first oxide layer 220 comprises a first cavity 221, a central cavity 227, and a second cavity 223. The first cavity 221 accommodates deformation of the first piezoelectric actuator 142 and the fourth piezoelectric actuator 148. The central cavity 227 accommodates rotation of the mirror 110. The second cavity 223 accommodates deformation of the second piezoelectric actuator 144 and the third piezoelectric actuator 146.

The metal layer 250 comprises a first plurality of electrodes 252, 254, 256, 258, a sub-portion 242M of the first piezoelectric actuator 142, a sub-portion 244M of the second piezoelectric actuator 144, a sub-portion 246M of the third piezoelectric actuator 146, and a sub-portion 248M of the fourth piezoelectric actuator 148.

The metal deposition 280 and 290 comprises a second plurality of electrodes 292, 294, 296, 298, a sub-portion 242U of the first piezoelectric actuator 142, a sub-portion 244U of the second piezoelectric actuator 144, a sub-portion 246U of the third piezoelectric actuator 146, and a sub-portion 248U of the fourth piezoelectric actuator 148.

The first piezoelectric actuator 142 comprises a first sub-portion 242S contained in the second silicon layer 230, a second sub-portion 242X contained in the second oxide layer 240, a third sub-portion 242M contained in the metal layer 250, a fourth sub-portion 242P contained in the piezoelectric film layer 260, a fifth sub-portion 242T contained in the TEOS deposition 270, and a six sub-portion 242U contained in the metal deposition 280 and 290.

The second piezoelectric actuator 144 comprises a first sub-portion 244S contained in the second silicon layer 230, a second sub-portion 244X contained in the second oxide layer 240, a third sub-portion 244M contained in the metal layer 250, a fourth sub-portion 244P contained in the piezoelectric film layer 260, a fifth sub-portion 244T contained in the TEOS deposition 270, and a six sub-portion 244U contained in the metal deposition 280 and 290.

The third piezoelectric actuator 146 comprises a first sub-portion 246S contained in the second silicon layer 230, a second sub-portion 246X contained in the second oxide layer 240, a third sub-portion 246M contained in the metal layer 250, a fourth sub-portion 246P contained in the piezoelectric film layer 260, a fifth sub-portion 246T contained in the TEOS deposition 270, and a six sub-portion 246U contained in the metal deposition 280 and 290.

The fourth piezoelectric actuator 148 comprises a first sub-portion 248S contained in the second silicon layer 230, a second sub-portion 248X contained in the second oxide layer 240, a third sub-portion 248M contained in the metal layer 250, a fourth sub-portion 248P contained in the piezoelectric film layer 260, a fifth sub-portion 248T contained in the TEOS deposition 270, and a six sub-portion 248U contained in the metal deposition 280 and 290.

In examples of the present disclosure, the first outer external actuator spring 142A comprises a first sub-portion 542S contained in the second silicon layer 230, a second sub-portion 542X contained in the second oxide layer 240, and a third sub-portion 542U contained in the metal deposition 280 and 290. The second outer external actuator spring 144A, the third outer external actuator spring 146A, and the fourth outer external actuator spring 148A have similar structure as the first outer external actuator spring 142A.

In examples of the present disclosure, the first outer internal actuator spring 142D comprises a first sub-portion 842S contained in the second silicon layer 230, a second sub-portion 842X contained in the second oxide layer 240, and a third sub-portion 842M contained in the metal layer 250. The second outer internal actuator spring 144D, the third outer internal actuator spring 146D, and the fourth outer internal actuator spring 148D have similar structure as the first outer internal actuator spring 142D.

In examples of the present disclosure, the first inner external actuator spring 142B comprises a first sub-portion 642S contained in the second silicon layer 230 and a second sub-portion 642X contained in the second oxide layer 240. The second inner external actuator spring 144B, the third inner external actuator spring 146B, and the fourth inner external actuator spring 148B have similar structure as the first inner external actuator spring 142B.

In examples of the present disclosure, the first inner internal actuator spring 142C comprises a first sub-portion 742S contained in the second silicon layer 230 and a second sub-portion 742X contained in the second oxide layer 240. The second inner internal actuator spring 144C, the third inner internal actuator spring 146C, and the fourth inner internal actuator spring 148C have similar structure as the first inner internal actuator spring 142C.

In examples of the present disclosure, a thickness of the second silicon layer 230 is thinner than a thickness of the first silicon layer 210 because a thickness of the mirror 110 is smaller than a deflection of the mirror 110 due to the rotation of the mirror 110 that is accommodated by the central cavity 217 of the first silicon layer 210.

Figure 3:
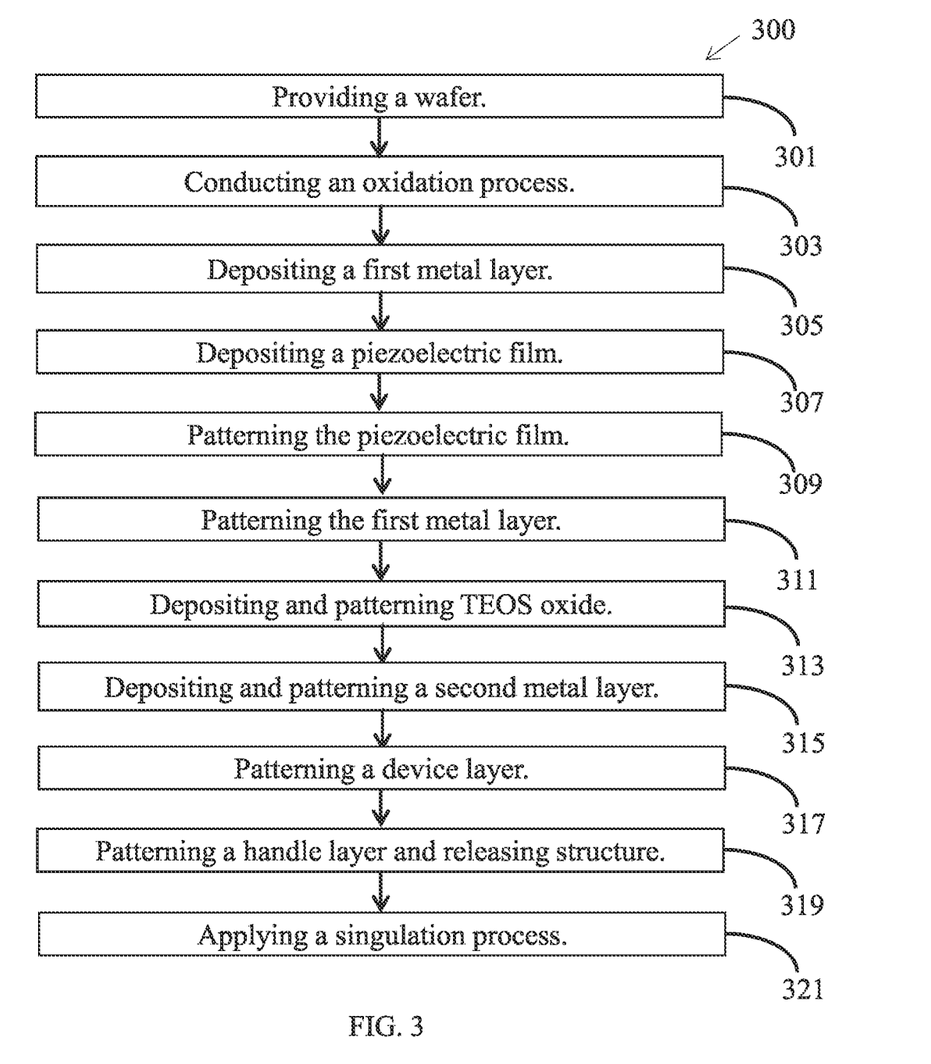
FIG. 3 is a flowchart of a process to develop a power semiconductor package in examples of the present disclosure.

FIG. 3 is a flowchart of a process 300 to develop a power semiconductor package in examples of the present disclosure. In one example, the process 300 is a manufacturing process for Micro-Electro Mechanical Systems (MEMS) scanners. The process 300 may start from block 301.

In block 301, referring now to FIG. 4A, a wafer 900 is provided. The wafer 900 comprises a lower silicon layer 910, a middle oxide layer 920, and an upper silicon layer 930. In examples of the present disclosure, the upper silicon layer 930 is thinner than the lower silicon layer 910. In one example, a diameter of the wafer 900 is four inches. In another example, a diameter of the wafer 900 is six inches. In still another example, a diameter of the wafer 900 is eight inches. Block 301 may be followed by block 303.

In block 303, referring now to FIG. 4B, an oxidation process is conducted. A bottom oxidation layer 908 is attached to the lower silicon layer 910. A top oxidation layer 940 is attached to the upper silicon layer 930. Block 303 may be followed by block 305.

In block 305, referring now to FIG. 4C, a first metal layer 950 is deposited. The first metal layer 950 is attached to the top oxidation layer 940. Block 305 may be followed by block 307.

In block 307, referring now to FIG. 4D, a piezoelectric film 960 is deposited. The piezoelectric film 960 is attached to the first metal layer 950. Block 307 may be followed by block 309.

In block 309, referring now to FIG. 4E, a patterning process is applied to the piezoelectric film 960 so as to form the piezoelectric film layer 962 (including the piezoelectric film layer 260 of FIG. 2). Block 309 may be followed by block 311.

In block 311, referring now to FIG. 4F, a patterning process is applied to the first metal layer 950 so as to form sections 952 (including sub-portions 242M, 244M, 246M, and 248M of FIG. 2) and sections 954 (including the electrodes 252, 254, 256, and 258 of FIG. 2). Block 311 may be followed by block 313.

In block 313, referring now to FIG. 4G, TEOS oxide is deposited and patterned so as to form TEOS 972 including a lower horizontal section 972B, a vertical section 972V, and an upper horizontal section 972B. Block 313 may be followed by block 315.

Figure 4H:
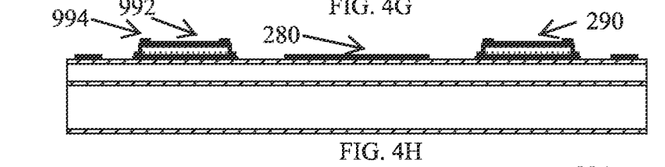

In block 315, referring now to FIG. 4H, a second metal layer is deposited and patterned so as to form the metal deposition 280 and 290. A first portion 994 is attached to the TEOS deposition 270. A second portion 992 is attached to the piezoelectric film layer 260. A third portion 280 is attached to the mirror 110. Block 315 may be followed by block 317.

In block 317, referring now to FIG. 4I, the upper silicon layer is patterned so as to form section 932 and section 934. Block 317 may be followed by block 319.

In block 319, referring now to FIG. 4J, the lower silicon layer is patterned and the structure is released so as to form section 912. Block 319 may be followed by block 321.

In block 321, a singulation process is applied so as to form a plurality of scanners 100.

Figure 5:
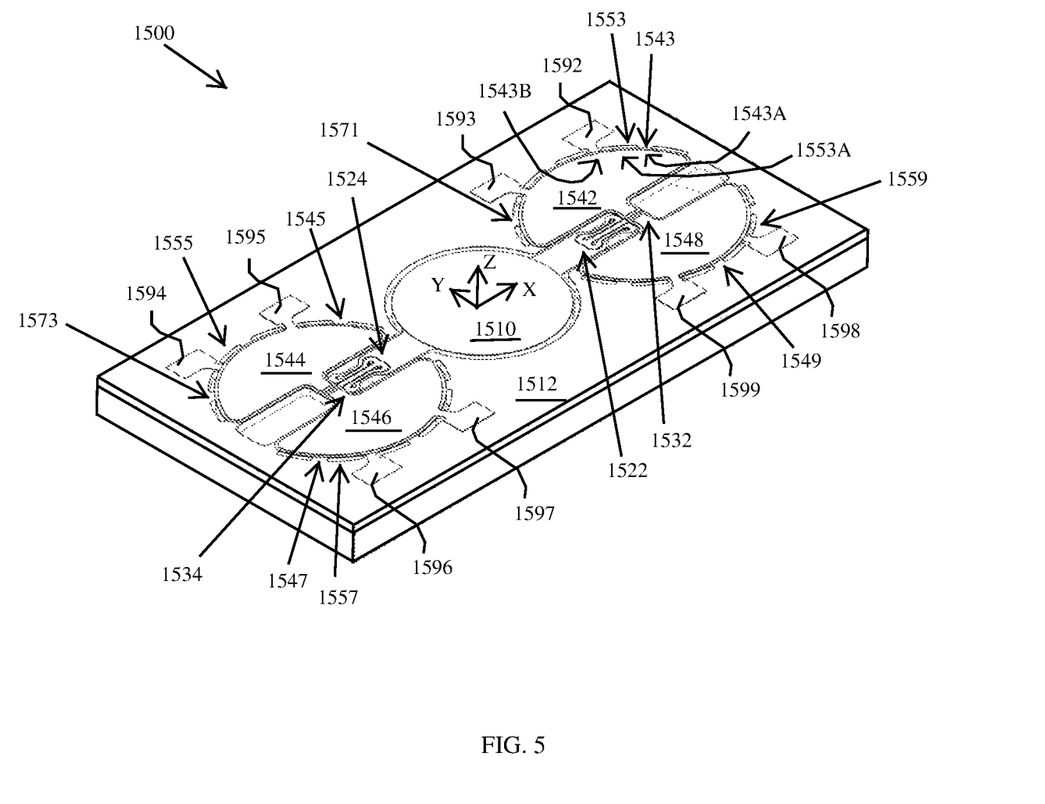
FIG. 5 is a schematic perspective view of another scanner in examples of the present disclosure.
Figure 6:
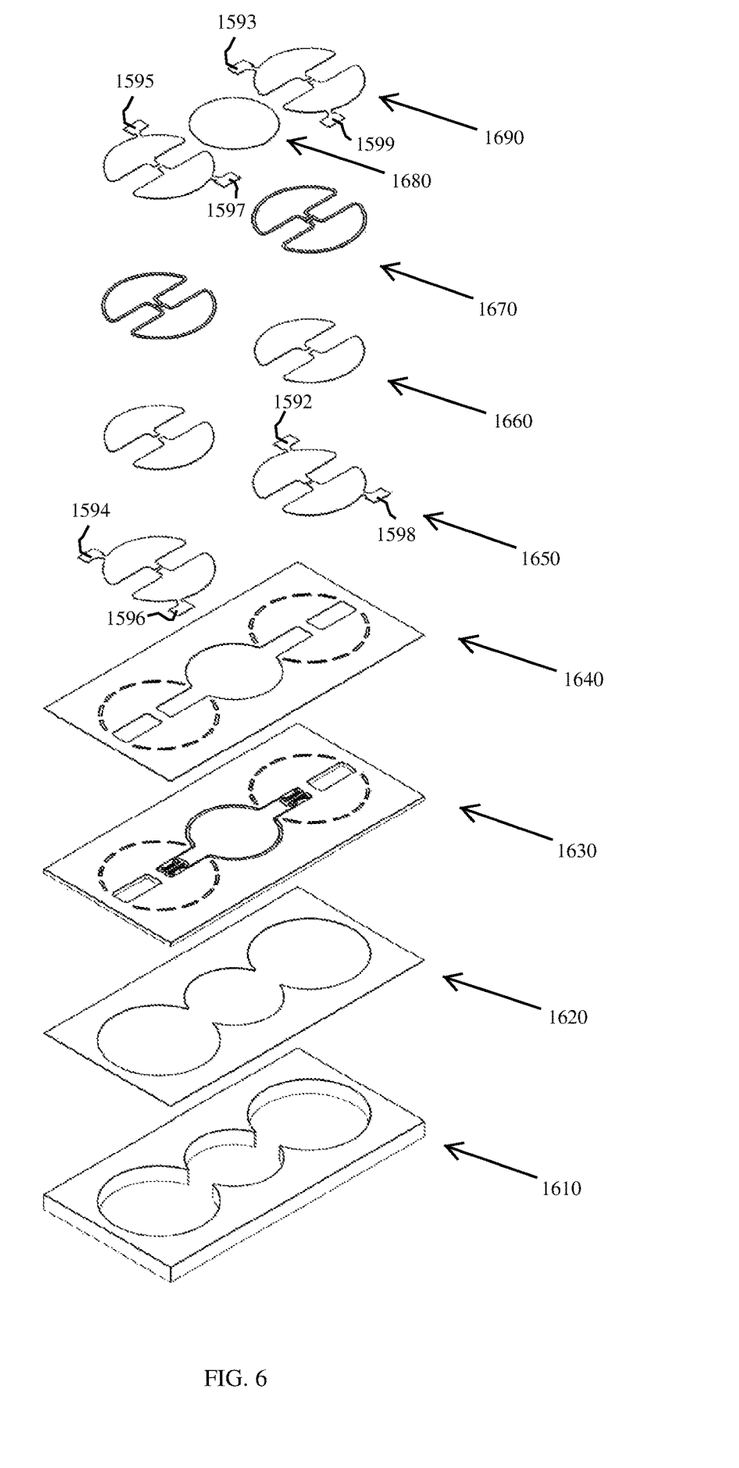
FIG. 6 is an exploded plot of the scanner of FIG. 5 in examples of the present disclosure.

FIG. 5 is a schematic perspective view of a scanner 1500 in examples of the present disclosure. FIG. 6 is an exploded plot of the scanner 1500 of FIG. 5 in examples of the present disclosure. The scanner 1500 comprises a mirror 1510, a first piezoelectric actuator 1542, a second piezoelectric actuator 1544, a third piezoelectric actuator 1546, a fourth piezoelectric actuator 1548, a first connecting member 1532, a second connecting member 1534, a first mirror spring 1522, a second mirror spring 1524, a stationary member 1512, a first plurality of actuator springs 1543, a second plurality of actuator springs 1545, a third plurality of actuator springs 1547, a fourth plurality of actuator springs 1549, a first plurality of electrodes (for example, 1592, 1594, 1596, and 1598), and a second plurality of electrodes (for example, 1593, 1595, 1597, and 1599).

In examples of the present disclosure, the first mirror spring 1522 and the second mirror spring 1524 are serpentine springs. Each of the first plurality of actuator springs 1543 and the fourth plurality of actuator springs 1549 is a linear spring extending along a corresponding radial direction of a first circle 1571. Each of the second plurality of actuator springs 1545 and the third plurality of actuator springs 1547 is a linear spring extending along a corresponding radial direction of a second circle 1573.

In examples of the present disclosure, the mirror 1510 is to rotate about a first direction, X-axis. The first connecting member 1532 connects the first piezoelectric actuator 1542 to the fourth piezoelectric actuator 1548. The second connecting member 1534 connects the second piezoelectric actuator 1544 to the third piezoelectric actuator 1546. The first mirror spring 1522 connects the mirror 1510 to the first connecting member 1532. The second mirror spring 1524 connects the mirror 1510 to the second connecting member 1534.

In examples of the present disclosure, the scanner 1500 is under excitation at a fundamental frequency of the scanner 1500. A mode shape of the fundamental frequency of the scanner 1500 includes a rotation of the mirror 1510, an upward concave deformation of the first piezoelectric actuator 1542, an upward concave deformation of the second piezoelectric actuator 1544, a downward concave deformation of the third piezoelectric actuator 1546, and a downward concave deformation of the fourth piezoelectric actuator 1548.

In examples of the present disclosure, driving signals are applied to top electrodes 1593, 1595, 1597, and 1599 and bottom electrodes 1592, 1594, 1596, and 1598 to drive the mirror. The driving signals of the first piezoelectric actuator 1542, the second piezoelectric actuator 1544, the third piezoelectric actuator 1546, and the fourth piezoelectric actuator 1548 are symmetric with respect to the YZ-plane and are anti-symmetric with respect to the XZ-plane.

In examples of the present disclosure, the first plurality of actuator springs 1543 connect the first piezoelectric actuator 1542 to the stationary member 1512. The second plurality of actuator springs 1545 connect the second piezoelectric actuator 1544 to the stationary member 1512. The third plurality of actuator springs 1547 connect the third piezoelectric actuator 1546 to the stationary member 1512. The fourth plurality of actuator springs 1549 connect the fourth piezoelectric actuator to the stationary member 1512.

In examples of the present disclosure, the first plurality of actuator springs 1543 are aligned along a first arc (for example, upper arc) of the first circle 1571. The second plurality of actuator springs 1545 are aligned along a first arc (for example, upper arc) of the second circle 1573. The third plurality of actuator springs 1547 are aligned along a second arc (for example, lower arc) of the second circle 1573. The fourth plurality of actuator springs 1549 are aligned along a second arc (for example, lower arc) of the first circle 1571.

In examples of the present disclosure, the first plurality of actuator springs 1543 are separated by a first plurality of arc-shape gaps 1553. In one example, a first arc-shape gap 1553A of the first plurality of arc-shape gaps 1553 separates a first actuator spring 1543A of the first plurality of actuator springs 1543 from a second actuator spring 1543B of the first plurality of actuator springs 1543. In one example, a bottom surface of a lead portion of a first electrode 1592 of the first plurality of electrodes is directly attached to a top surface of the second actuator spring 1543B.

In examples of the present disclosure, the second plurality of actuator springs 1545 are separated by a second plurality of arc-shape gaps 1555. The third plurality of actuator springs 1547 are separated by a third plurality of arc-shape gaps 1557. The fourth plurality of actuator springs 1549 are separated by a fourth plurality of arc-shape gaps 1559.

In examples of the present disclosure, the scanner 1500 includes a first silicon layer 1610, a first oxide layer 1620, a second silicon layer 1630, a second oxide layer 1640, a metal layer 1650, a piezoelectric film layer 1660, a tetraethyl orthosilicate (TEOS) deposition 1670, and a metal deposition 1680 and 1690.

Those of ordinary skill in the art may recognize that modifications of the embodiments disclosed herein are possible. For example, the shape and the size of the mirror may vary. The stiffness of the springs may vary. A number of the first plurality of actuator springs may vary. Other modifications may occur to those of ordinary skill in this art, and all such modifications are deemed to fall within the purview of the present invention, as defined by the claims.

The invention claimed is:

1. A scanner comprising:
a mirror to rotate about a first direction;
a first piezoelectric actuator;
a second piezoelectric actuator;
a third piezoelectric actuator;
a fourth piezoelectric actuator;
a first connecting member connecting the first piezoelectric actuator to the fourth piezoelectric actuator;
a second connecting member connecting the second piezoelectric actuator to the third piezoelectric actuator;
a first mirror spring connecting the mirror to the first connecting member;
a second mirror spring connecting the mirror to the second connecting member;
a stationary member;
a first plurality of actuator springs connecting the first piezoelectric actuator to the stationary member;
a second plurality of actuator springs connecting the second piezoelectric actuator to the stationary member;
a third plurality of actuator springs connecting the third piezoelectric actuator to the stationary member; and
a fourth plurality of actuator springs connecting the fourth piezoelectric actuator to the stationary member.

2. The scanner of claim 1, wherein the first piezoelectric actuator and the second piezoelectric actuator are symmetric with respect to a first plane perpendicular to the first direction;
wherein the third piezoelectric actuator and the fourth piezoelectric actuator are symmetric with respect to the first plane;
wherein the first piezoelectric actuator and the fourth piezoelectric actuator are symmetric with respect to a second plane containing the first direction;
wherein the second piezoelectric actuator and the third piezoelectric actuator are symmetric with respect to the second plane; and
wherein the first plane is perpendicular to the second plane.

3. The scanner of claim 2, wherein the scanner is under excitation at a fundamental frequency of the scanner;
wherein a mode shape of the fundamental frequency of the scanner includes a rotated mirror;
an upward concave deformation of the first piezoelectric actuator;
an upward concave deformation of the second piezoelectric actuator;
a downward concave deformation of the third piezoelectric actuator; and
a downward concave deformation of the fourth piezoelectric actuator.

4. The scanner of claim 1, wherein the first plurality of actuator springs are aligned along a first arc of a first circle;
wherein the second plurality of actuator springs are aligned along a first arc of a second circle;

wherein the third plurality of actuator springs are aligned along a second arc of the second circle;
wherein the fourth plurality of actuator springs are aligned along a second arc of the first circle;
wherein the first plurality of actuator springs are separated by a first plurality of arc-shape gaps;
wherein the second plurality of actuator springs are separated by a second plurality of arc-shape gaps;
wherein the third plurality of actuator springs are separated by a third plurality of arc-shape gaps; and
wherein the fourth plurality of actuator springs are separated by a fourth plurality of arc-shape gaps.

5. The scanner of claim 1, wherein the first plurality of actuator springs comprises
a first outer external actuator spring;
a first outer internal actuator spring;
a first inner external actuator spring; and
a first inner internal actuator spring;
wherein the second plurality of actuator springs comprises
a second outer external actuator spring;
a second outer internal actuator spring;
a second inner external actuator spring; and
a second inner internal actuator spring;
wherein the third plurality of actuator springs comprises
a third outer external actuator spring;
a third outer internal actuator spring;
a third inner external actuator spring; and
a third inner internal actuator spring; and
wherein the fourth plurality of actuator springs comprises
a fourth outer external actuator spring;
a fourth outer internal actuator spring;
a fourth inner external actuator spring; and
a fourth inner internal actuator spring.

6. The scanner of claim 1, wherein the scanner includes
a first silicon layer;
a first oxide layer;
a second silicon layer;
a second oxide layer;
a metal layer;
a piezoelectric film layer;
an insulation layer; and
a metal deposition.

7. The scanner of claim 6, wherein the first oxide layer comprises silicon dioxide;
wherein the second oxide layer comprises silicon dioxide;
wherein the metal layer comprises platinum and titanium;
wherein the insulation layer comprises silicon nitride or tetraethyl orthosilicate (TEOS); and
wherein the metal deposition comprises platinum and titanium.

8. The scanner of claim 6, wherein an entirety of a top surface of the first silicon layer is flat;
wherein an entirety of a bottom surface of the first silicon layer is flat;
wherein an entirety of a top surface of the second silicon layer is flat;
wherein an entirety of a bottom surface of the second silicon layer is flat;
wherein an entirety of a top surface of the metal layer is flat;
wherein an entirety of a bottom surface of the metal layer is flat;
wherein an entirety of a top surface of the piezoelectric film layer is flat;
wherein an entirety of a bottom surface of the piezoelectric film layer is flat;
wherein the insulation layer comprises
a lower horizontal section;
a vertical section; and
an upper horizontal section; and
wherein the metal deposition comprises
a first portion attached to the insulation layer;
a second portion attached to the piezoelectric film layer; and
a third portion attached to the mirror.

9. The scanner of claim 8, wherein an entirety of the first mirror spring is contained in the second silicon layer; and
wherein an entirety of the second mirror spring is contained in the second silicon layer.

10. The scanner of claim 9, wherein the first silicon layer comprises
a first cavity accommodating deformation of the first piezoelectric actuator and the fourth piezoelectric actuator;
a central cavity accommodating rotation of the mirror; and
a second cavity accommodating deformation of the second piezoelectric actuator and the third piezoelectric actuator.

11. The scanner of claim 9, wherein the first oxide layer comprises
a first cavity accommodating deformation of the first piezoelectric actuator and the fourth piezoelectric actuator;
a central cavity accommodating rotation of the mirror; and
a second cavity accommodating deformation of the second piezoelectric actuator and the third piezoelectric actuator.

12. The scanner of claim 9, wherein the metal layer comprises a first plurality of electrodes; and
wherein the metal deposition comprises a second plurality of electrodes.

13. The scanner of claim 9, wherein the first piezoelectric actuator comprises
a first sub-portion contained in the second silicon layer;
a second sub-portion contained in the second oxide layer;
a third sub-portion contained in the metal layer;
a fourth sub-portion contained in the piezoelectric film layer;
a fifth sub-portion contained in the insulation layer; and
a six sub-portion contained in the metal deposition.

14. The scanner of claim 9, wherein a thickness of the second silicon layer is thinner than a thickness of the first silicon layer.

15. A method of fabricating the scanner of claim 9, the method comprising the steps of
providing a wafer comprising
a lower silicon layer;
a middle oxide layer; and
an upper silicon layer;
conducting an oxidation process;
depositing a first metal layer;
depositing a piezoelectric film;
patterning the piezoelectric film so as to form the piezoelectric film layer;
patterning the first metal layer;
forming the insulation layer;
depositing and patterning a second metal layer so as to form the metal deposition;
patterning the upper silicon layer;
patterning the lower silicon layer and releasing structure; and
applying a singulation process.

* * * * *